United States Patent
Wu et al.

(10) Patent No.: US 7,178,827 B2
(45) Date of Patent: Feb. 20, 2007

(54) OCCUPANT EJECTION PREVENTION ASSEMBLY

(75) Inventors: Fubang N. Wu, Rochester Hills, MI (US); Jialiang Le, Canton, MI (US); Karen M. Balavich, Lake Orion, MI (US); Clifford C. Chou, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 308 days.

(21) Appl. No.: 10/708,116

(22) Filed: Feb. 10, 2004

(65) Prior Publication Data

US 2005/0173901 A1 Aug. 11, 2005

(51) Int. Cl.
*B60R 21/20* (2006.01)
*B60R 21/16* (2006.01)

(52) U.S. Cl. .................................. 280/730.2; 280/749
(58) Field of Classification Search ............. 280/730.1, 280/730.2, 748, 749
See application file for complete search history.

(56) References Cited

U.S. PATENT DOCUMENTS

| | | | | |
|---|---|---|---|---|
| 4,966,388 A * | 10/1990 | Warner et al. | ............ | 280/730.1 |
| 5,277,441 A * | 1/1994 | Sinnhuber | ................. | 280/730.1 |
| 5,316,336 A * | 5/1994 | Taguchi et al. | ........... | 280/730.2 |
| 5,324,072 A * | 6/1994 | Olson et al. | .............. | 280/730.2 |
| 5,605,346 A * | 2/1997 | Cheung et al. | ........... | 280/728.2 |
| 5,647,609 A * | 7/1997 | Spencer et al. | .......... | 280/730.2 |
| 5,722,685 A * | 3/1998 | Eyrainer | ................... | 280/730.2 |
| 5,730,464 A * | 3/1998 | Hill | ........................... | 280/743.2 |
| 6,540,253 B2 * | 4/2003 | Acker et al. | .............. | 280/730.2 |
| 6,612,611 B1 * | 9/2003 | Swann et al. | ............. | 280/730.2 |
| 6,773,031 B2 * | 8/2004 | Haig | ............................ | 280/749 |
| 6,793,239 B2 * | 9/2004 | Feldman et al. | ............ | 280/729 |
| 2003/0075910 A1 * | 4/2003 | Inoue et al. | ................. | 280/749 |
| 2004/0164528 A1 * | 8/2004 | Boegge et al. | ........... | 280/730.2 |

FOREIGN PATENT DOCUMENTS

| | | | | |
|---|---|---|---|---|
| DE | 19843111 A1 | * | 3/2000 | |
| JP | 6-1198 | * | 1/1994 | |
| WO | WO 01/83273 A1 | * | 11/2001 | |

* cited by examiner

*Primary Examiner*—Ruth Ilan
(74) *Attorney, Agent, or Firm*—Frank A. MacKenzie; Artz & Artz PLC

(57) ABSTRACT

An automotive ejection prevention assembly is provided comprising an airbag mounted within the beltline of a vehicle door. The airbag has an airbag stored condition and an airbag deployed position. The airbag expands vertically upwards from the beltline when in the airbag deployed position. A cover cloth assembly is mounted within a window frame of the vehicle door. The cover cloth assembly has a vertical restraint edge mounted to a vertical portion of the window frame and a horizontal restraint edge mounted to the beltline. The cover cloth assembly includes an inner cloth surface and an outer cloth surface joined to form an internal pocket. The airbag is positioned within the internal pocket. The cover cloth assembly fills a portion of the window frame upon the airbag entering the airbag deployed position. The cover cloth assembly prevents occupant ejection through the window frame.

18 Claims, 2 Drawing Sheets

OCCUPANT EJECTION PREVENTION ASSEMBLY

BACKGROUND OF INVENTION

The present invention relates generally to an automotive occupant ejection prevention assembly and more particularly to a beltline positioned airbag assembly.

Automotive vehicle design is governed by the constant and unending pursuit of improved occupant comfort and safety. Each generation of vehicle design and production proceeds down a path that provides occupants with more and more improvements. These improvements are not always paradigm shifts but are often improvements over existing technology or the adaptation of existing technology to provide improved application. The industry has therefore placed great value on the development and improvement of new safety technologies.

A staple of modern occupant safety technology is airbag assembly systems. Airbag assemblies are utilized to absorb occupant momentum during impact scenarios such that injury to the occupants is minimized. Recognition of the benefits of airbag technology has lead to a diversity of advancements in both airbag design and application. One genus of such improvements can be categorized as side airbag designs. Present side airbag designs imitate traditional frontal impact designs wherein the airbag is inflated out of a module during impact towards the occupant. The nature of the vehicle structure, however, places severe constraints on side airbag placement. Side airbags, therefore, are often positioned immediately above the door armrest. This provides sufficient backing door structure behind the airbag upon inflation. Commonly, however, the occupant is positioned well above this position and therefore no structural backing is positioned between the occupant and the window frame. If the window is closed, then limited structural backing can be provided an airbag, but if open often a side inflated airbag has insufficient back support to properly protect an occupant.

Furthermore, present side airbag designs do not properly protect an occupant from the hazards associated with vehicle rollover. An open or damaged window creates the risk of occupant ejection from the vehicle during rollover. Clearly, retaining the occupant within the vehicle provides the best opportunity for injury minimization. Existing side mounted airbag systems, however, are not triggered by a vehicle rollover unless in response to a side-impact during rollover. When such systems deploy, it is possible for a partially ejected occupant to be caught between the airbag and the window frame. It would be more desirable to have an airbag assembly that responded directly to a vehicle rollover to minimize the opportunity for occupant ejection. It would further be highly desirable to have an airbag assembly that exerted forces on the occupant during deployment that served to direct the occupant back into the vehicle.

SUMMARY OF INVENTION

It is, therefore, an object of the present invention to provide an automotive ejection prevention assembly with improved deployment stability. It is a further object of the present invention to provide an automotive ejection prevention assembly that serves to direct occupants back into the vehicle during rollover.

In accordance with the objects of the present invention, an automotive ejection prevention assembly is provided. The automotive ejection prevention assembly includes an airbag mounted within the beltline of a vehicle door. The airbag has an airbag stored condition and an airbag deployed position. The airbag expands vertically upwards from the beltline when in the airbag deployed position. A cover cloth assembly is mounted within a window frame of the vehicle door. The cover cloth assembly has a vertical restraint edge mounted to a vertical portion of the window frame and a horizontal restraint edge mounted to the beltline. The cover cloth assembly includes an inner cloth surface and an outer cloth surface joined to form an internal pocket. The airbag is positioned within the internal pocket. The cover cloth assembly fills a portion of the window frame upon the airbag entering the airbag deployed position. The cover cloth assembly prevents occupant ejection through the window frame.

Other objects and features of the present invention will become apparent when viewed in light of the detailed description of the preferred embodiment when taken in conjunction with the attached drawings and appended claims.

DETAILED DESCRIPTION

Figure 1:
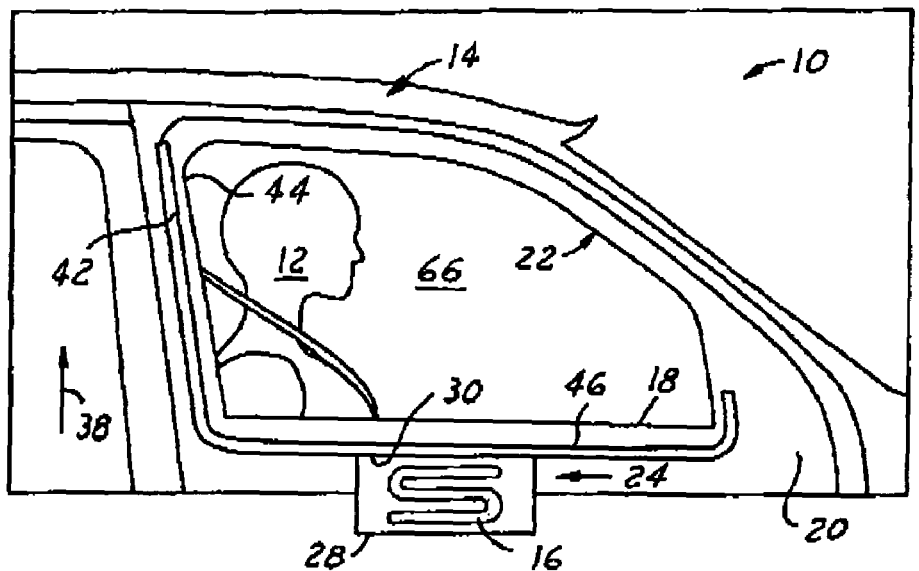
FIG. 1 is an illustration of an automotive ejection prevention assembly in accordance with the present invention, the assembly illustrated in an airbag stored condition.

Referring now to FIG. 1, which is an illustration of an automotive ejection prevention assembly 10 in accordance with the present invention. The automotive ejection prevention assembly 10 is intended to be utilized in a wide variety of vehicles and in a wide variety of specific configurations. It is intended, however, to be primarily utilized to protect an occupant 12 positioned within the automobile 14 during rollover or side impact. The present invention provides a unique approach to airbag design and implementation to offer additional protection to the occupant 12.

Figure 6:
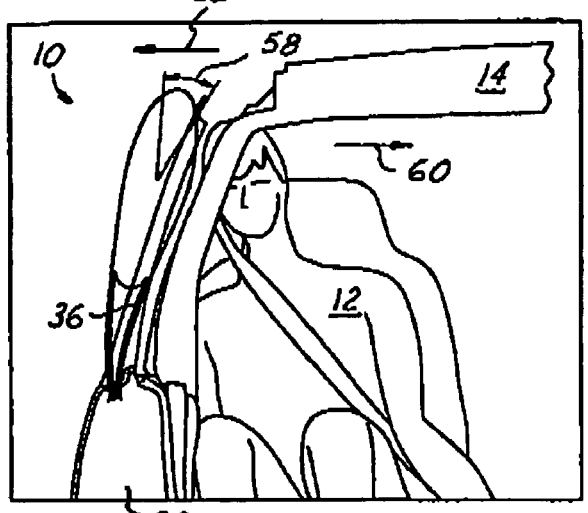
FIG. 6 is an illustration of an automotive ejection prevention assembly as illustrated in FIG. 5, the illustration depicting the deployment of the airbag.
Figure 7:
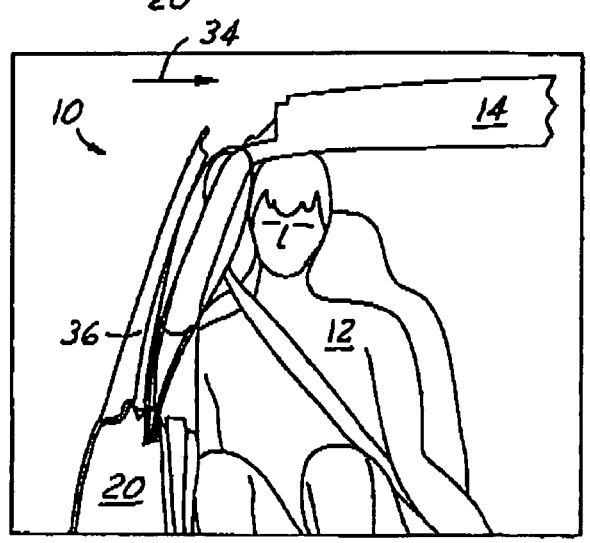
FIG. 7 is an illustration of an automotive ejection prevention assembly as illustrated in FIG. 5, the illustration depicting the airbag forcing the occupant back through the window frame.

The present invention provides such advantages by including an airbag 16 positioned within the beltline 18 of the vehicle door 20. The area formed by the lower horizontal portion of the window frame 22 defines the beltline 18. The airbag 16 has an airbag stored condition 24 and an airbag deployed position 26 (see FIG. 2). When in the airbag stored condition 24, it is contemplated that the airbag 16 can be stored within an airbag module 28 positioned within the vehicle door 20 and having a vertically orientated deployment opening 30. The airbag 16 may be folded or arranged in a wide variety of positions and formations within the airbag module 28 prior to deployment. It should be understood that the airbag 16 and airbag module 28 may be positioned within the vehicle door 20 either outboard 32 (see FIG. 6) or inboard 34 (see FIG. 7) of the vehicle window assembly 36. Each mounting location, outboard 32 or inboard 34, provides unique manufacturing, security, and performance benefits that may be tailored to specific vehicle requirements.

Figure 2:
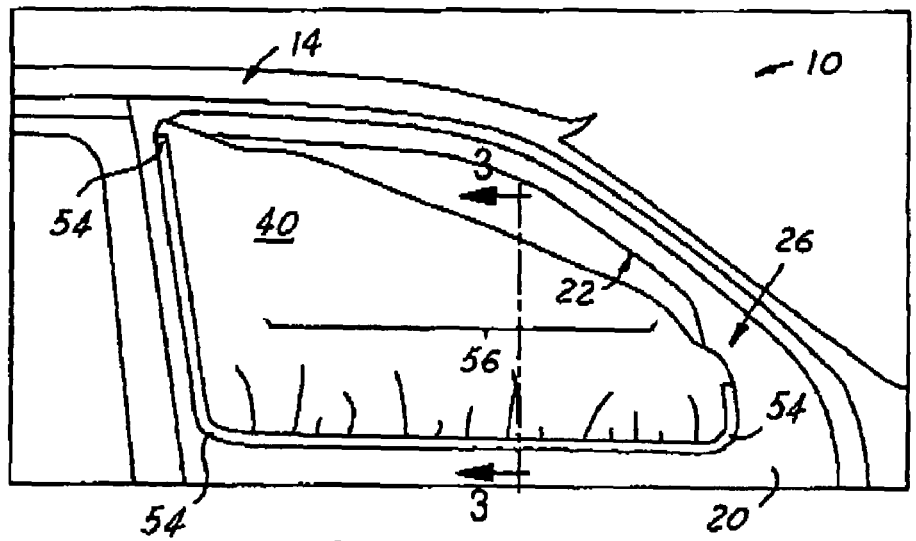
FIG. 2 is an illustration of an automotive ejection prevention assembly as illustrated in FIG. 1, the assembly illustrated in an airbag deployed position.
Figure 3:
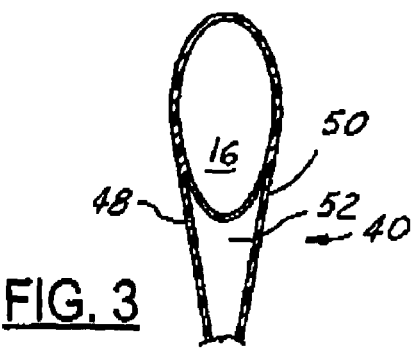
FIG. 3 is a detail cross-sectional illustration of the airbag illustrated in FIG. 2, the airbag illustrated in the airbag deployed position.

The airbag 16 when deployed, expands vertically upward 38 from the beltline 18 (see FIG. 1) to enter the airbag deployed position 26 (see FIG. 2). By deploying the airbag 16 vertically 38 rather than from a side direction, as side-impact airbags commonly do, the present invention utilizes the airbag 16 to quickly and efficiently fill the open space of the window frame 22 and thereby prevents ejection of the occupant 12. The present invention further improves the performance of the airbag 16 by including a cover cloth assembly 40 (see FIG. 3) mounted within the window frame 22 of the vehicle door 20. The cover cloth assembly 40 includes a vertical restraint edge 42 mounted to a vertical portion 44 of the window frame 22 (see FIG. 1). The cover cloth assembly 40 further includes a horizontal restraint edge 46 mounted to the beltline 18 (see FIG. 1). The cover cloth assembly 40 includes an inner cloth surface 48 and an outer cloth surface 50 joined to form an internal pocket 52 (see FIG. 3). The airbag 16 is positioned within the internal pocket 52.

The cover cloth assembly 40 provides unique functionality to the airbag 16 by providing a plurality of anchor points 54 along the window flame 22 from which the airbag 16 is supported (see FIG. 2). Although a triangular cover cloth assembly 40 and anchor points 54 are illustrated, alternate configurations may be developed for vehicle specific applications. The anchor points 54 serve to provide inboard/outboard stability to the airbag 16 without regard to whether the window assembly 36 is open or closed. This provides airbag effectiveness in an open window condition often lacking in prior airbag configurations. Furthermore, the cover cloth assembly 40 provides an expanded engagement surface 56 with which to engage the occupant 12. This reduces the criticality of placement of the airbag module 28 while improving occupant 12 engagement. Furthermore, by controlling the deployment angle 58, relative to the window frame 22, of the cover cloth assembly 40 (see FIG. 6) an inward force 60 can be exerted on the occupant 12. This, in turn, forces a partially ejected occupant 12 back into the vehicle 14. Although a wide variety of deployment angles 58 maybe utilized, angles as small as five degrees may be sufficient to generate the desired inward force 60.

Figure 4:
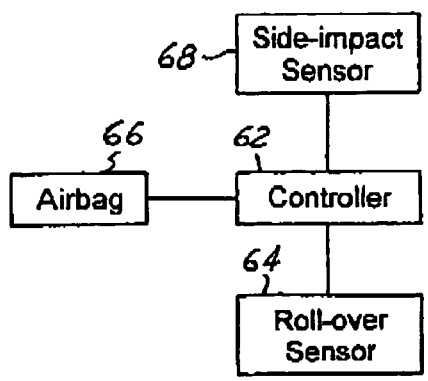
FIG. 4 is a box diagram of the automotive ejection prevention assembly illustrated in FIG. 1.
Figure 5:
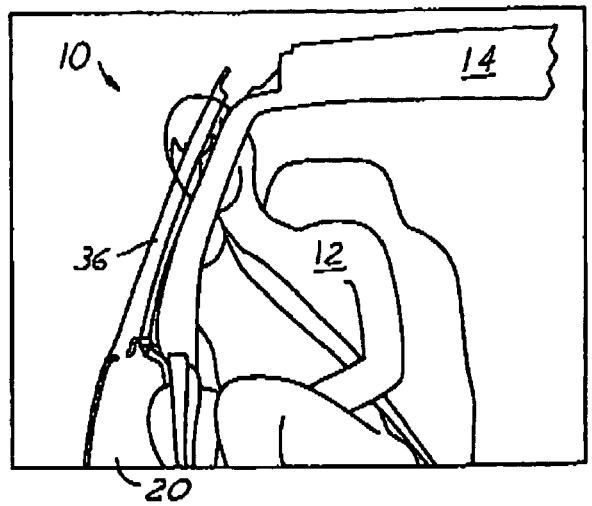
FIG. 5 is an illustration of an automotive ejection prevention assembly as illustrated in FIG. 1, the illustration depicting an occupant within the window frame.

It is contemplated that the automotive ejection prevention assembly 10 can control airbag 16 deployment in a variety of fashions. In one embodiment, the present invention contemplates the airbag 16 in communication with a controller 62 from which deployment decisions can be automatically determined (see FIG. 4). By placing a rollover sensor 64 in communication with the controller 62, the airbag 16 can be deployed based on vehicle roll-angle or acceleration. This allows the cover cloth assembly 40 to act as a substitute barrier for a window assembly 36 that is open or has been compromised. Furthermore, by generating the inward force 60, the present invention can be used to push the occupant 12 back inside the vehicle 14 such that the occupant 12 is retained within the vehicle cockpit 66 during rollover. The controller 62 may additionally/alternately be in communication with a side-impact sensor 68 such that a side-impact of the vehicle 14 can be registered. By deploying the airbag 16 in response to a side-impact the present invention provides occupant protection at normal head levels rather than many arm-rest side deployment configurations. In addition, the cover cloth assembly 40 provides outboard resilience without concern for window position or integrity. Thus the present invention provides an improved airbag assembly 10.

While particular embodiments of the invention have been shown and described, numerous variations and alternative embodiments will occur to those skilled in the art. Accordingly, it is intended that the invention be limited only in terms of the appended claims.

The invention claimed is:

1. An automotive ejection prevention assembly comprising:
   an airbag mounted within the beltline of a vehicle door, said airbag having an airbag stored condition and an airbag deployed position, said airbag expanded vertically upwards from said beltline when in said airbag deployed position;
   a cover cloth assembly mounted within a window frame of said vehicle door, said cover cloth assembly having a vertical restraint edge mounted to a vertical position of said window frame and a horizontal restraint edge mounted to said beltline, said cover cloth assembly including an inner cloth surface and an outer cloth surface joined to form an internal pocket, said airbag positioned within said internal pocket;
   wherein said cover cloth assembly fills a portion of said window frame as a result of said airbag inflating within said internal pocket as said airbag enters said airbag deployed position, said cover cloth assembly preventing occupant ejection through said window frame.

2. An automotive ejection prevention assembly as described in claim 1, wherein said airbag is positioned inboard of said window frame.

3. An automotive ejection prevention assembly as described in claim 1, wherein said airbag is positioned outboard of said window frame.

4. An automotive ejection prevention assembly as described in claim 1, wherein said cover cloth assembly comprises a triangular cloth assembly.

5. An automotive ejection prevention assembly as described in claim 1, wherein said cover cloth assembly is mounted to said window frame using at least three triangular anchor points.

6. An automotive ejection prevention assembly as described in claim 1, further comprising:
   a side-impact sensor;
   a controller in communication with said side-impact sensor and said airbag, said controller deploying said airbag in response to said side-impact sensor.

7. An automotive ejection prevention assembly as described in claim 6, further comprising:
   a rollover sensor, said controller in communication with said rollover sensor and deploying said airbag in response to said rollover sensor.

8. An automotive ejection prevention assembly as described in claim 1, wherein said airbag is deployed at a deployment angle greater than 5 degrees relative to a window plane within said window frame.

9. An automotive ejection prevention assembly as described in claim 1, wherein said cover cloth assembly generates an inward force on a passenger protruding through said window frame.

10. An automotive ejection prevention assembly comprising:
- an airbag mounted within the beltline of a vehicle door, said airbag having an airbag stored condition and an airbag deployed position, said airbag expanded vertically upwards from said beltline when in said airbag deployed position;
- a rollover sensor;
- a controller in communication with said rollover sensor and said airbag, said controller deploying said airbag in response to said rollover sensor;
- A cover cloth assembly mounted within a window frame of said vehicle door, said cover cloth assembly having a vertical restraint edge mounted to a vertical portion of said window frame and a horizontal restraint edge mounted to said beltline, said cover cloth assembly including an inner cloth surface and an outer cloth surface joined to form an internal pocket, said airbag positioned within said internal pocket, said cover cloth assembly fills a portion of said window frame as a result of said airbag inflating within said internal pocket as said airbag enters said airbag deployed position.

11. An automotive ejection prevention assembly as described in claim 10, wherein said airbag is positioned inboard of said window frame.

12. An automotive ejection prevention assembly as described in claim 10, wherein said airbag is positioned outboard of said window frame.

13. An automotive ejection prevention assembly as described in claim 10, further comprising:
- a side-impact sensor, said controller in communication with said side-impact sensor and deploying said airbag in response to said side-impact sensor.

14. An automotive ejection prevention assembly as described in claim 10, wherein said cover cloth assembly is mounted to said window frame using at least three triangular anchor points.

15. An automotive ejection prevention assembly as described in claim 10, wherein said airbag generates an inward force on a passenger protruding through said window frame when said airbag moves into the airbag deployed position.

16. A method of preventing passenger ejection during a vehicular rollover comprising:
- storing an airbag within the beltline of a vehicle door, said airbag having an airbag stored condition and an airbag deployed position;
- monitoring a rollover sensor to determine vehicle orientation;
- deploying said airbag vertically upward from said beltline into a window frame such that said airbag enters said airbag deployed position when said rollover sensor indicates a rollover;
- preventing occupant ejection through said window frame by placing said airbag within a cover cloth assembly mounted within said window frame of said vehicle door, said cover cloth assembly having a vertical restraint edge mounted to a vertical portion of said window frame and a horizontal restraint edge mounted to said beltline, said cover cloth assembly including an inner cloth surface and an outer cloth surface joined to form an internal pocket, said airbag positioned within said internal pocket, said cover cloth assembly fills a portion of said window frame as a result of said airbag inflating within said internal pocket as said airbag enters said airbag deployed position.

17. A method as described in claim 16, further comprising:
- securing said cover cloth assembly wherein to said window frame using at least three triangular anchor points.

18. A method as described in claim 16, further comprising:
- monitoring a side-impact sensor; and
- deploying said airbag vertically upwards from said beltline into a window frame such that said airbag enters said airbag deployed position when said vehicle indicates side-impact.

* * * * *